United States Patent [19]

Balcar et al.

[11] Patent Number: 5,022,897

[45] Date of Patent: Jun. 11, 1991

[54] METHOD FOR HAZARDOUS WASTE REMOVAL AND NEUTRALIZATION

[75] Inventors: Gerald P. Balcar, Newfoundland, N.J.; Paul Krumrine, Hatfield, Pa.; Neal Schwartz, Fayetteville, N.Y.; Burton J. Sutker, Edison; Gail J. Wood, West Milford, both of N.J.

[73] Assignees: Potters Industries, Inc., Parsippany, N.J.; Roth Bros. Smelting Corp., Syracuse, N.Y.

[21] Appl. No.: 440,899

[22] Filed: Nov. 22, 1989

[51] Int. Cl.⁵ ............................................. B01D 46/00
[52] U.S. Cl. ......................................... 55/96; 55/97; 55/262; 55/341.1; 65/134; 241/22
[58] Field of Search ............ 55/97, 96, 341.1, 341.2, 55/262; 65/134; 210/777, 778, 193; 241/22

[56] References Cited

U.S. PATENT DOCUMENTS

| | | | |
|---|---|---|---|
| 2,838,881 | 6/1958 | Plumat | 49/58 |
| 3,041,808 | 7/1962 | Snyder | 55/304 |
| 3,092,478 | 6/1963 | Smith | 55/262 |
| 3,245,769 | 4/1966 | Eck et al. | 65/27 |
| 3,397,972 | 8/1968 | Brichard et al. | 65/27 |
| 3,573,940 | 4/1971 | Cockrell et al. | 106/84 |
| 4,028,201 | 6/1977 | Tyssee | 204/72 |
| 4,029,489 | 6/1977 | Froberg et al. | 65/136 |
| 4,046,546 | 9/1977 | Hynd | 65/135 |
| 4,208,201 | 6/1980 | Rueck | 65/27 |
| 4,270,935 | 6/1981 | Reinauer | 55/379 |
| 4,299,611 | 11/1981 | Penberthy | 65/27 |
| 4,319,890 | 3/1982 | Teller et al. | 55/1 |
| 4,325,711 | 4/1982 | Kober et al. | 55/5 |
| 4,398,931 | 8/1983 | Shevlin | 55/341 |
| 4,464,184 | 8/1984 | Cera et al. | 55/21 |
| 4,604,111 | 8/1986 | Natale | 55/97 |
| 4,655,806 | 4/1987 | Bowersox | 55/302 |
| 4,696,685 | 9/1987 | Wood | 55/97 |
| 4,855,082 | 8/1989 | Duivelaar | 252/629 |

FOREIGN PATENT DOCUMENTS 1501866 2/1978 United Kingdom ................. 55/262

Primary Examiner—Bernard Nozick
Attorney, Agent, or Firm—Curtis, Morris & Safford

[57] ABSTRACT

A method of coating a filter medium in a flowing gaseous stream, the method comprising: directing a gas stream along a feed path; combining with said gas stream a multiplicity of finished glass dust particles; positioning a fibrous filter medium along said feed path downstream of the point at which the glass dust particles are combined with said stream, the glass dust particles forming a coating on said filter medium to assist in the capture thereon of hazardous waste material in said stream, when said stream contains such material; maintaining the temperature of the gas stream below the softening point of the glass particles; and intermittently removing the particulate coating material and any such hazardous waste material from the filter medium and collecting the same; and a system for accomplishing the same.

23 Claims, 2 Drawing Sheets

METHOD FOR HAZARDOUS WASTE REMOVAL AND NEUTRALIZATION

FIELD OF THE INVENTION

This invention relates to hazardous waste removal, and more particularly to removal of hazardous waste from a flowing gaseous stream, as well as neutralization of the removed waste, and to a neutralized product containing same.

BACKGROUND OF THE INVENTION

The present invention, while of general application, is particularly well suited for disposing of hazardous waste associated with secondary aluminum smelting.

Secondary smelting of aluminum is an environmentally desirable practice as it recycles much of the material that would normally be deposited in the waste stream. The smelting procedure nevertheless produces materials such as cadmium oxide, lead oxide, chromium oxide, nickel oxide and other undesirable residues which have been designated as harmful to the environment.

To collect undesirable residues in the waste gas from aluminum or other metal smelting furnaces, it has been common practice heretofore to direct the furnace emissions to a baghouse dust collector, or in some cases to a scrubber or other filter screening system. As is well known, baghouse dust collectors comprise a series of fibrous filter bags which receive the waste gas stream and remove residues from the stream. The removed residues form a coating on the filter bags which is periodically removed and discarded as hazardous waste as they comprise hazardous materials.

To increase the filtration capability of the bags they often are precoated with fine particles of lime, limestone flour or nepthylene syenite. In addition to reducing the size of the hazardous residues that can pass through the filters, the particles provide a flame or heat barrier and in the case of lime and limestone tend to neutralize any acids in the exhaust.

The precoating materials utilized heretofore, however, have proved deficient in several respects. In the secondary melting of aluminum, for example, aluminum particles in the waste gas stream are oxidizing and burning, and the heat barrier properties of the precoating material have been insufficient to prevent a charring or burning of the filter bags. Baghouse fires are difficult to control and can cause extensive damage. In addition, the prior precoating materials have not been particularly effective in facilitating the removal of some of the more hazardous oxides in the stream. Further difficulties have been encountered in the disposal of the hazardous residues from the bags.

STATEMENT OF THE INVENTION

One general object of the invention, therefore, is to provide a new and improved method of coating a filter bag or other filter medium in a flowing gas stream.

Another object is to provide a new and improved system for hazardous waste removal.

More specifically, it is an object of the invention to provide a method of precoating the filter medium, and to provide a system, which utilize a novel coating material for the filter.

Another object of the invention is to provide a method of and system for neutralizing hazardous waste upon the removal of the waste from the filter medium.

A further object of the invention is to provide a neutralized and useful material from the hazardous waste removed from the filter medium.

In one of its aspects, the invention is a method which comprises directing a flowing gaseous stream along a feed path, and combining a multiplicity of glass dust particles with the stream. These particles comprise finished glass particles as opposed to glass forming materials. A fibrous filter medium is positioned along the feed path downstream of the point at which the particles are combined therewith, and the particles form a coating on the filter medium. The stream is then connected to the furnace or other hazardous waste source, and the glass dust particles on the filter assist in the capture of hazardous waste, when hazardous waste material is present in the stream. The particulate coating is intermittently removed from the filter and collected for further use. Typically, when hazardous waste material has been filtered out of the gaseous stream by the filter, such material is removed with the particulate coating material.

In another of its aspects, the invention is a method of neutralizing hazardous waste in a flowing gaseous stream, the method comprising: directing a gas stream along a feed path; combining with said gas stream a multiplicity of glass dust particles; positioning a fibrous filter medium along said feed path downstream of the point at which the glass particles are combined with said stream, the glass dust particles, and hazardous waste material when said stream contains such material, being captured by and adhering to said filter medium; intermittently removing the particulate material and any such hazardous waste material from the filter medium and collecting the same; and combining additional glass dust particles with the collected material such that hazardous waste material can be neutralized.

In yet another of its aspects, the invention is a system for removing hazardous waste from a flowing gaseous stream, which comprises: means for directing a gas stream along a feed path; means for combining with said gas stream a multiplicity of finished glass dust particles; a fibrous filter medium positioned along said feed path downstream of the point at which the glass dust particles are combined with said stream, such that the filter medium is capable of intercepting the glass dust particles to form a coating on said filter medium to assist in the capture thereon of hazardous waste material, when said stream contains such material; means for intermittently removing the particulate material and any such hazardous waste material from the filter medium; and means for collecting the same.

In a further aspect, the invention is a system for neutralizing hazardous waste in a flowing gaseous stream, the system comprising: means for directing a gas stream along a feed path; means for combining with said gas stream a multiplicity of glass dust particles; a fibrous filter medium positioned along said feed path downstream of the point at which the glass particles are combined with said stream, such that the filter medium is capable of capturing the glass dust particles, and hazardous waste material when said stream contains such material, for adhesion to said filter medium; means for intermittently removing the particulate material and any such hazardous waste material from the filter medium; means for collecting the removed material; and means for combining additional glass dust particles with the collected material in an amount sufficient to effect neutralization of the same.

In still another aspect, the invention is a neutralized amorphous glass produced in accordance with the aforementioned method.

The present invention confers substantial benefits on its practitioner. Hazardous waste material is removed efficiently and cost-effectively. A significant advantage is that hazardous waste material taken from the gas stream can be combined (e.g., layered) on the filter medium, in situ as it were, with glass particulate. This obviates the need for a separate step of mixing the waste with glass after the former's removal from the filter medium, with evident processing and cost economies. This furthers the invention's enhanced capability for neutralizing hazardous waste material making it suitable for utilization in meeting stricter standards for controlling toxic waste emission. Additionally, the precoating with glass particles, in accordance with the invention, helps to assure waste is securely contained, without appreciable risk of leaching into the environment, and that the resulting waste-containing amorphous glass is a useful product.

The present invention, as well as further objects, features and advantages thereof, will become more fully understood from the following description, when read with reference to the accompanying drawings.

DESCRIPTION OF CERTAIN PREFERRED EMBODIMENTS

In accordance with the invention, extremely fine particles of glass dust are utilized as a precoating material for the filter medium. Glass dust is a common by-product in the manufacture of various glass articles. In the manufacture of glass spheres from crushed particles of soda lime glass, for example, the glass dust residue can constitute about 10 to 15 percent by weight of the crushed particles, and its disposal has been an expensive and time consuming procedure.

An important feature of the invention is the utilization of the glass dust particle coating, not only as a pre-coat which improves filtering capabilities, but further as a material with which the waste is combined or mixed right on the filter medium—i.e., in situ—for later processing to produce a leach-resistant material.

Not only does the glass dust coating improve the filtering capabilities of the bags, but it also minimizes potential for the ignition of filter bag material, particularly when the individual dust particles are provided with a coating of borax, ammonium phosphate or similar material.

In accordance with another feature of the invention, in several advantageous embodiments, the glass dust particles are coated with an ignition resistant material prior to their introduction into the gaseous stream. In some cases alkaline chemicals (such as CaO, MgO, $Na_2CO_3$, $NaHCO_3$, and the like) are added to the coating. The arrangement is such that the incidence of charring or burning of the filter medium is greatly reduced, and there is little or no leaching of undesirable materials from the coating.

In accordance with yet another feature of several good arrangements in accordance with the invention, additional glass dust particles are added to the collected particulate coating, and any hazardous waste material combined therewith after removal from the filter medium, and the particulate is then melted and cooled to form a neutralized amorphous glass. The aluminum oxide in the material provides a glass which exhibits good hardness with a less reactive surface. During the melting procedure the leachable lead, cadmium oxide and other undesirable components are neutralized. In conjunction with cooling (e.g., either during or after cooling, depending on the method used), the material can be comminuted to provide a particulate product. Fritting, grinding and other conventional comminution techniques are suitable. The resulting particles comprise a fully neutralized material that may be utilized as a special purpose industrial material without the need for following hazardous waste procedures.

Figure 1:
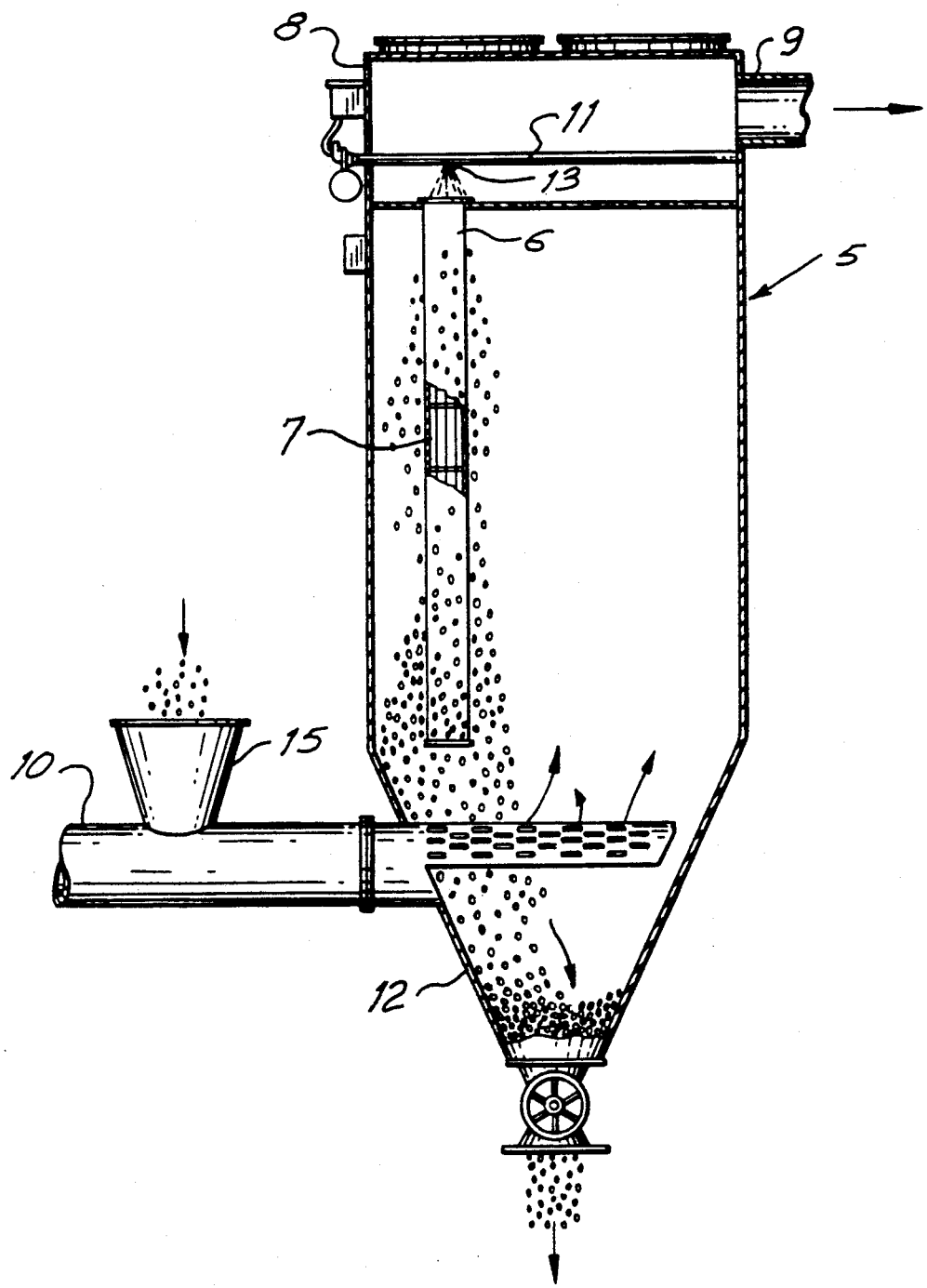
FIG. 1 is a vertical sectional view of a typical baghouse installation that has been modified in accordance with an illustrative embodiment of the invention.

Referring to FIG. 1 of the drawings, there is shown a baghouse installation indicated generally at 5. The installation 5 includes a series of filter bags 6, only one of which is shown in FIG. 1 (for the sake of simplicity), of polyester felt or similar filter material. Each bag 6 is supported by a wire mesh cage 7, and in the illustrated embodiment the lower end of the bag is closed while the upper end is open and exposed to a chamber 8 leading to an exhaust conduit 9. An infeed conduit 10 is located adjacent the lower portion of the baghouse installation to direct a flowing gaseous stream against the cylindrical surfaces of the bags and then into the chamber 8 and the exhaust conduit 9. The stream contains alumina, chromium oxide, cadmium oxide, zinc oxide, lead oxide, nickel oxide and other hazardous waste materials from an aluminum smelting furnace or other aluminum smelting process, for example, and the waste collects on the surfaces of the bags while the clean portion of the stream passes through the bags and is discharged to the atmosphere from the conduit 9.

As the particulate layer of hazardous waste builds up on the bags 6, the pressure drop across the bags increases, and the bags are intermittently cleaned to dislodge the accumulated particles. The cleaning can be automatically performed, either by mechanical shaking or reverse flow, and illustratively is performed periodically, for instance, at intervals of eight hours or so depending upon the rate of collection of the waste on the bag fabric. In the illustrative configuration, the upper open ends of bag 6 are below opening 11 of compressed air line 13 so as to receive, during a cleaning period, a blast of compressed air to effect reverse flow. The discharged waste drops into a hopper 12 at the lower end of the baghouse installation 5.

An additional hopper 15 is located in the infeed conduit 10 for the introduction of minute particles of glass dust to combine with the gas stream. These particles are of finished soda lime glass and are extremely fine. For example, 90% of the particles are of size less than 75 microns in maximum dimension. In other embodiments, the particles are of size less than about 65 microns in maximum dimension, or have a median size of 35 microns in maximum dimension. The particles are used to precoat the filter bags 6, and to accomplish this a stream of clean unheated air is introduced into the infeed conduit 10. The air stream entrains the glass dust particles and carries them into the baghouse installation 5 to provide a glass coating on the external surfaces of the bags 6. The coating serves to increase the filtration capability of the bags, and it reduces the size of the particulate material that can pass through the bag fabric.

As will be apparent from the foregoing, the constituent materials of the gas stream typically vary over time. For instance, when glass dust particles are being combined with the gas stream in order to apply a precoat on the filter medium, the stream comprises air, whereas when the precoat is in place on the filter medium the gas stream comprises the exhaust from a smelting furnace. Additionally, the gas stream flow is not necessarily continuous, but can be interrupted over time without departing from the invention.

Prior to their introduction into the hopper 15, the glass dust particles advantageously are provided with a coating of borax, ammonium phosphate or similar ignition resistant material. The infeed conduit 10 is then connected to the exhaust from a secondary aluminum smelting furnace, for example, and hazardous waste in the exhaust gas stream is captured on the external surfaces of the bags to prevent its discharge into the atmosphere from the conduit 9. The ignition resistant coating on the particles of glass dust serves to protect the bag material from possible ignition by hot or reactive materials in the waste gas stream, and this is particularly important in secondary aluminum smelting because aluminum particles in the stream often are oxidizing and burning at a temperature which can ignite the bag material. To reduce the frequency of performing the bag cleaning operation, the temperature of the exhaust stream at the time it reaches the bags preferably is maintained below the softening point of the glass particles during the waste removal operation.

In some cases, a coating on the glass dust particles, such as a phosphate coating, reacts with heavy metal oxides in the waste gas stream to reduce even further the water-solubility of the oxides after vitrification of the combined glass particles and waste materials.

Figure 2:
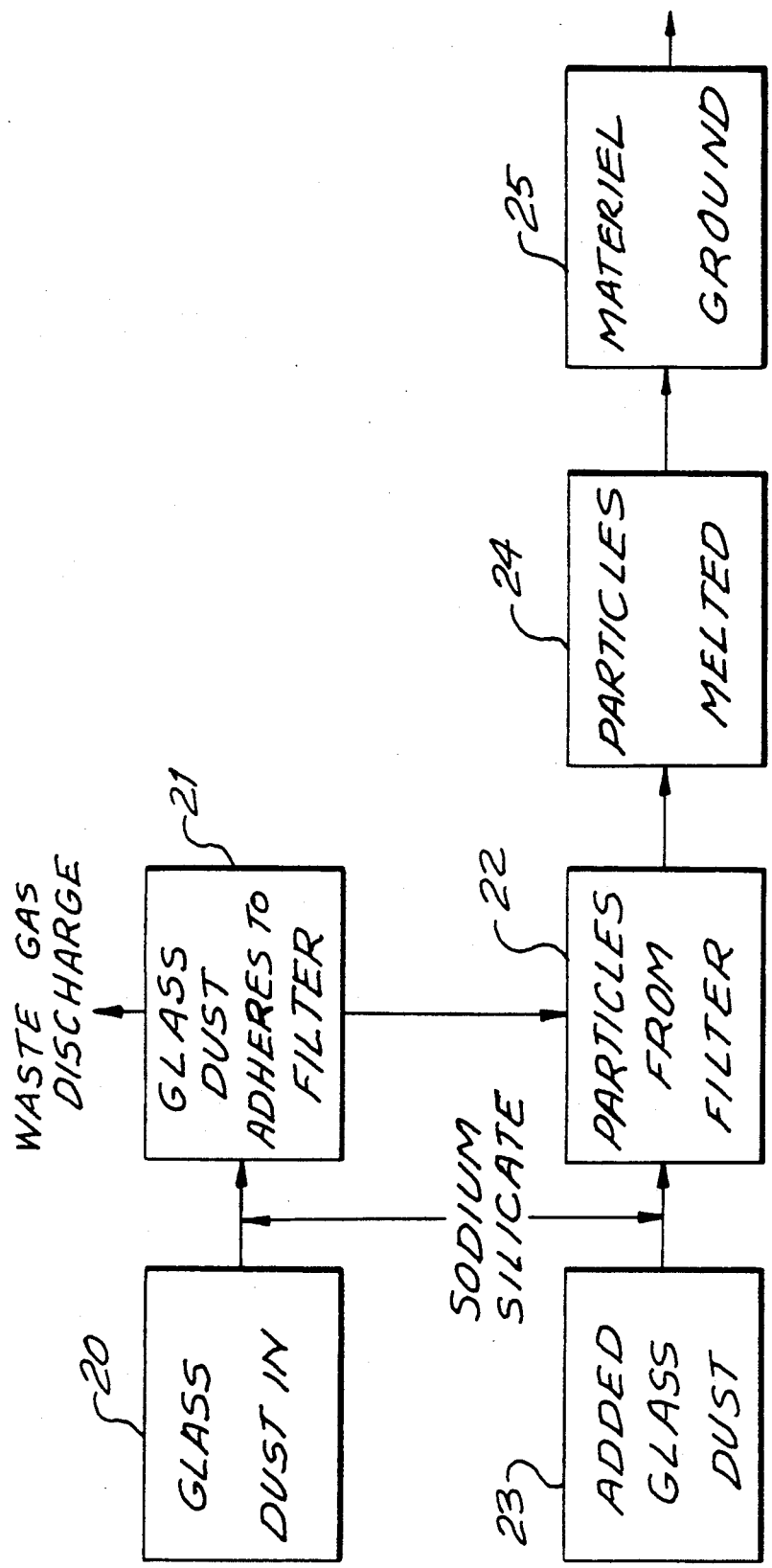
FIG. 2 is a schematic flow diagram of a method of neutralizing hazardous waste for the baghouse installation of FIG. 1.

The material collected in the hopper 12 during the bag cleaning operation comprises a mixture of glass and hazardous waste from the surfaces of the bags. Referring to FIG. 2, the box 20 represents the glass dust being fed to the baghouse installation, the box 21 represents the glass dust as it adheres to the surfaces of the bags, and the box 22 represents the glass and hazardous waste mixture collected during the cleaning operation. To neutralize the mixture and provide a useful product, additional clean glass dust is added from the box 23. Additionally, sodium silicate or a similar substance can be combined with the mixture of glass dust particles and hazardous waste material. Typically, this can be effected by combining sodium silicate or the like with the glass dust particles introduced into the gas stream, or with the glass dust particles combined with the collected glass dust and hazardous waste material, or with both. The combined materials are then heated so that the glass is melted as represented by the box 24.

The molten glass serves as a solvent for a wide variety of materials, and once these materials are made solute they are insoluble according to standard leaching tests. The addition of aforementioned substances such as sodium silicate assists in the dissolution of lead oxides into the glass mass and greatly improves the solubility of other heavy metal oxides in the glass melt. Typically, these substances are added to the mix in amount ranging from 5-20 wt %. The oxides dissolve extremely well as a result of the sodium silicate. The solubility of glass in water is extremely limited; it is virtually insoluble.

The mixing of the sodium silicate glass and the baghouse residues may be performed in a ribbon blender or other mixing device with the addition of water and/or silicate solution. The mixture may be passed through a simple extrusion system to compact it into a rod which is then directed into a dryer and ground as illustrated by the box 25. This affords safe transport of the material to off-site locations. The melted material may be fritted for sale and subsequent reuse. The leachables from the frit would meet current EPA standards for drinking water.

The product is an amorphous glass material which has special properties of hardness and toughness, and is useful, inter alia, as a bonded abrasive, as a nonskid abrasive, as a loose-grain abrasive, as roofing granules, as a ceramic ingredient, as a material for the manufacture of acid-resistant bricks or lining, as particles for the manufacture of inexpensive sand paper or other coated abrasives, and for the manufacture of glass beads or other glass products. The material has many of the characteristics of soda lime glass with a high alumina content, it is insoluble, and it demonstrates no leaching of the hazardous waste. Other applications include its use as a road aggregate, grading rock or in other construction applications.

In order to disclose the nature of the present invention more thoroughly, the following examples illustrating the invention are given. It should be understood, however that this is done solely by way of example and is intended neither to delineate the scope of the invention nor limit the ambit of the appended claims.

Example 1

As an example of the effectiveness of the present invention in the handling of hazardous waste from a secondary aluminum smelting furnace, finished soda lime glass dust is introduced in a clean air stream at ambient temperature into a baghouse installation of the type generally shown in FIG. 1 (although the installation utilized for this example does not employ reverse flow to remove material from the bags). The baghouse installation is of conventional construction and, such as manufactured by Griffin Environmental Co., Inc., Syracuse, N.Y., and marketed under the trade name Jet-Aire. The installation includes 600 polyester felt filter bags which each has a diameter of 4.25" and a length of 99". 850 pounds of dust, and 150 pounds of lime, are employed for the total bag area, which area is calculated to be 26,400 ft. Thus, the amount of glass dust particles per unit area average of 0.032 lbs./ft.$^2$, and the amount of lime per unit area averages 0.006 lbs./ft.$^2$. With respect to the particle size range of such glass powder, not less than 90% passes U.S. sieve 170; between 60 and 70% passes U.S. sieve 400; the mean particles size falls between 30 and 40 microns in maximum dimension. The dust particles adhere to the surfaces of the bags to reduce the size of the openings between individual fibers.

The baghouse installation is then connected to the exhaust gaseous stream from three smelting furnaces. The velocity of the stream from the furnaces is 3500 ft./min. The temperature of the exhaust stream upon reaching the bags is below the softening point of soda lime glass, in this case at 190° F.; this has the beneficial effect of preventing possible fusing or melting of the glass.

The bags are allocated among seven different chambers in the installation. At any one time, six of the chambers are receiving gas-flow, and one is not. The bags in this latter chamber are cleaned by mechanical shaking for a twenty-minute period. After shaking, nothing is left on the bags. Then, gas-flow to the chamber with the cleaned bags is resumed, and another of the seven chambers is shut down for cleaning. This process is continued so that all seven chambers are cyclically and repeatedly cleaned. The dust, containing hazardous material, removed from the bags during cleaning is collected in a hopper for further processing into a useful product in which the hazardous waste material is securely contained.

Example 2

In order to demonstrate the applicable parameters for formulation of the neutralized amorphous glass containing collected hazardous waste, the following experiment was performed:

Three powders were mixed together by weight as follows:

10% sodium silicate SS-C 200 (2.0 ratio sodium silicate - including 32.7% $Na_2O$, 65.4% $SiO_2$)

50% D-dust (Potters soda/lime glass waste)

40% Roth Bros. crusher dust (high alumina/D-dust precoat)

These powders were mixed on a roller mill for about 30 minutes to assure homogeneity of the mix prior to fusion. Each fusion was carried out in an alumina crucible because platinum crucibles were unable to withstand test conditions. Generally, each sample was preheated to 650° to 700° C. to drive off volatiles, such as carbon-containing materials, and then heated to 1200° C. for one hour to achieve fusion. Earlier tests at 1100° C. did not visually appear to result in fusion.

Preheating was carried out, for safety reasons, in a small lab furnace; in a large scale commercial operation it could be eliminated under certain conditions. Each melt was allowed to cool, then broken out of the crucible, and tested in accordance with the EP Leach procedure for heavy metals.

The results were as follows:

| Analysis Name | Final Result | Units |
|---|---|---|
| Barium | <0.1 | mg/l |
| Cadmium | 0.007 | mg/l |
| Chromium | <0.05 | mg/l |
| Lead | 1.52 | mg/l |
| Mercury | <0.0005 | mg/l |
| Selenium | <0.02 | mg/l |
| Silver | <0.01 | mg/l |
| Arsenic | <0.05 | mg/l |

The sample was found not to exhibit the characteristic of EP toxicity—as defined in Section 261.24, Federal Register, 1980, p. 33122.

A similar analysis on dust removed from filter bags not pre-coated with glass dust particles yielded the following results:

| Analysis Name | Final Result | Units |
|---|---|---|
| Barium | 0.8 | mg/l |
| Cadmium | 0.477 | mg/l |
| Chromium | 0.24 | mg/l |
| Lead | 15.4 | mg/l |
| Mercury | <0.0005 | mg/l |
| Selenium | 0.14 | mg/l |

-continued

| Analysis Name | Final Result | Units |
|---|---|---|
| Silver | <0.01 | mg/l |
| Arsenic | <0.5 | mg/l |

The quantitation limit for arsenic was increased due to the nature of the sample matrix.

The second sample was found to exhibit the characteristic of EP toxicity as defined in Section 261.24, Federal Register, 1980, p. 33122. Lead exceeded the limit.

A comparison of the two analyses shows the dramatic improvement realized with the invention.

The above analyses were performed on an EP Toxicity leachate of the submitted waste prepared according to the procedure specified in Federal Register, May 19, 1980, p. 33127. A sample is considered EP Toxic if an of the contaminant concentrations (mg/1) in the leachate exceed the following maxima:

Lead 5.0, Arsenic 5.0, Barium 100.0, Cadmium 1.0, Chromium 5.0, Mercury 0.2, Selenium 1.0, Silver 5.0.

In the aforementioned testing all materials were in a dry form. For a commercial scale operation, all or a portion of the sodium silicate might be added in a liquid, to pre-agglomerate or pelletize the other dusts. This would cut the potential for air entrainment of the dust and eliminate an inhalation hazard and nuisance.

Additionally, it is noted that a product available from PQ Corporation that could be used, of equivalent ratio to the SS-C 200 powder, would be D-brand sodium silicate at 44.1% solids. Also, one could use the N-brand sodium silicate (3.2 ratio - 8.9% $Na_2O$, 28.7% $Si_2O$) for the agglomeration as this would be a better adhesive to bind the dusts. The N-brand itself costs less, but then may need to be supplemented with some extra SS-C 200 powder added to the mix in a dry form to get the proper final ratios, so as to incorporate the added lime into the glassy matrix incompletely.

"SS-C 200", "D", and "N" are trademarks of PQ Corporation.

What is claimed is:

1. A method of coating a filter medium in a flowing gaseous stream, the method comprising:

directing a gas stream along a feed path;

combining with said gas stream a multiplicity of glass dust particles;

positioning a fibrous filter medium along said feed path downstream of the point at which the glass dust particles are combined with said stream, the glass dust particles forming a coating on said filter medium to assist in the capture thereon of hazardous waste material when said stream contains such material; and intermittently removing the particulate coating material and any such hazardous waste material from the filter medium and collecting the same.

2. A method of coating a filter medium in a flowing gaseous stream, the method comprising:

directing a gas stream along a feed path;

combining with the gas stream a multiplicity of glass dust particles coated with an ignition resistant material;

positioning a fibrous filter medium along said feed path downstream of the point at which the glass dust particles are combined with said stream, the glass dust particles forming a coating on said filter medium to assist in the capture thereon of hazardous waste material when said stream contains such material; and intermittently removing the particulate coating material and any such hazardous waste material from the filter medium and collecting the same.

3. A method as defined in claim 1 or 2, wherein the multiplicity of glass dust particles is such that at least 90% are of size less than 75 microns in maximum dimension.

4. A method as defined in claim 1 or 2, wherein the glass dust particles are soda lime glass.

5. A method as defined in claim 1 or 2, wherein sodium silicate is combined with said glass dust particles.

6. A method of coating a filter medium in a flowing gaseous stream, the method comprising:
   directing a gas stream along a feed path;
   combining with said gas stream a multiplicity of soda lime glass dust particles;
   positioning a fibrous filter medium along said feed path downstream of the point at which the glass dust particles are combined with said stream, the glass dust particles forming a coating on said filter medium to assist in the capture thereon, and combination therewith in situ, of hazardous waste material when said stream contains such material;
   intermittently removing the particulate coating material and any such hazardous waste material from the filter medium and collecting the same; and
   combining additional glass dust particles with the collected material.

7. A method of coating a filter medium in a flowing gaseous stream, the method comprising:
   directing a gas stream along a feed path;
   combining with the gas stream a multiplicity of soda lime glass dust particles coated with an ignition resistant material;
   positioning a fibrous filter medium along said feed path downstream of the point at which the glass dust particles are combined with said stream, the glass dust particles forming a coating on said filter medium to assist in the capture thereon, and combination therewith in situ, of hazardous waste material when said stream contains such material;
   intermittently removing the particulate coating material and any such hazardous waste material from the filter medium and collecting the same; and
   combining additional glass dust particles with the collected material.

8. A method as defined in claim 6 or 7, wherein the multiplicity of glass dust particles is such that at least 90% are of size less than 75 microns in maximum dimension.

9. A method as defined in claim 6 or 7, wherein the glass dust particles combined with the collected material are soda lime glass.

10. A method as defined in claim 6 or 7, wherein the glass dust particles combined with the gas stream, or the glass dust particles combined with the collected material, or both, are combined with sodium silicate.

11. A method of neutralizing hazardous waste in a flowing gaseous stream, the method comprising:
    directing a gas stream along a feed path;
    combining with said gas stream a multiplicity of glass dust particles;
    positioning a fibrous filter medium along said feed path downstream of the point at which the glass particles are combined with said stream, the glass dust particles, and hazardous waste material when said stream contains such material, being captured by and adhering to said filter medium;
    intermittently removing the particulate material and any such hazardous waste material from the filter medium and collecting the same; and
    combining additional glass dust particles with the collected material such that hazardous waste material can be neutralized.

12. A method of neutralizing hazardous waste in a flowing gaseous stream, the method comprising:
    directing a gas stream along a feed path;
    combining with said gas stream a multiplicity of glass dust particles coated with an ignition resistant material;
    positioning a fibrous filter medium along said feed path downstream of the point at which the glass dust particles are combined with said stream, the glass dust particles, and hazardous waste material when said stream contains such material, being captured by and adhering to said filter medium;
    intermittently removing the particulate material and any such hazardous waste material from the filter medium and collecting the same; and
    combining further glass dust particles with the collected material such that hazardous waste material can be neutralized.

13. A method as defined in claim 11 or 12, wherein the multiplicity of glass dust particles is such that at least 90% are of size less than 75 microns in maximum dimension.

14. A method as defined in claim 11 or 12, wherein the glass dust particles combined with the gas stream, the glass dust particles combined with the collected material, or both, are soda lime glass.

15. A method as defined in claim 11 or 12, wherein the glass dust particles combined with the glass stream, the gas dust particles combined with the collected material, or both, are combined with sodium silicate.

16. A method as defined in claim 11 or 12, wherein the hazardous waste material contains one or more of chromium oxide, cadmium oxide, zinc oxide, lead oxide and nickel oxide.

17. A method of neutralizing hazardous waste in a flowing gaseous stream, the method comprising:
    directing a gas stream along a feed path;
    combining with the gas stream a multiplicity of soda lime glass dust particles;
    positioning a fibrous filter medium along said feed path downstream of the point at which the glass dust particles are combined with said stream, the glass dust particles, and hazardous waste material when said stream contains such material, being captured by and adhering to said filter medium;
    intermittently removing the particulate material and any such hazardous waste material from the filter medium and collecting the same;
    combining further glass dust particles with the collected material such that hazardous waste material can be neutralized;
    melting the particulate material and then comminuting the material for formation of a neutralized amorphous glass.

18. A method of neutralizing hazardous waste in a flowing gaseous stream, the method comprising:
    directing a gas stream along a feed path;
    combining with the gas stream a multiplicity of soda lime glass dust particles coated with an ignition resistant material;

positioning a fibrous filter medium along said feed path downstream of the point at which the glass dust particles are combined with said stream, the glass dust particles, and hazardous waste material when said stream contains such material, being captured by and adhering to said filter medium;

intermittently removing the particulate material and any such hazardous waste material from the filter medium and collecting the same;

combining further glass dust particles with the collected particulate material such that hazardous waste material can be neutralized;

melting the particulate material and then comminuting the material to form a neutralized amorphous glass.

19. A method as defined in claim 17 or 18, wherein the glass dust particles added to the collected material are soda lime glass.

20. A method as defined in claim 17 or 18, wherein the comminution step includes fritting.

21. A method as defined in claim 17 or 18, wherein the comminution step includes grinding.

22. A method as defined in claim 17 or 18, wherein the glass dust particles combined with the gas stream, the glass dust particles combined with the collected material, or both, are combined with sodium silicate.

23. A method s defined in claim 17 or 18, wherein the multiplicity of glass dust particles is such that at least 90% are of size less than 75 microns in maximum dimension.

* * * * *